May 1, 1923.  1,453,368
F. W. TEVES
SPEED REGULATOR FOR AUTOMOBILES
Filed Jan. 25, 1922   2 Sheets-Sheet 1

Frederick W. Teves
INVENTOR
BY Frank S. Wentworth
his ATTORNEY.

May 1, 1923.

F. W. TEVES

SPEED REGULATOR FOR AUTOMOBILES

Filed Jan. 25, 1922     2 Sheets-Sheet 2

1,453,368

Patented May 1, 1923.

1,453,368

UNITED STATES PATENT OFFICE.

FREDERICK W. TEVES, OF EAST ELMHURST, NEW YORK, ASSIGNOR OF ONE-HALF TO ARTHUR HAZEN GREEN, OF NEW YORK, N. Y.

SPEED REGULATOR FOR AUTOMOBILES.

Application filed January 25, 1922. Serial No. 531,564.

*To all whom it may concern:*

Be it known that I, FREDERICK W. TEVES, a citizen of the United States, residing at East Elmhurst, in the borough of Queens, city of New York, county of Queens, and State of New York, have invented certain new and useful Improvements in Speed Regulators for Automobiles, of which the following is a specification, reference being had therein to the accompanying drawings, which form a part thereof.

My invention relates to speed regulators for automobiles, and more particularly to a type thereof adapted to interrupt the functioning of the ignition system of the engine for driving the automobile, in the event that the speed of the vehicle exceeds a predetermined number of miles per hour.

It is common in different communities to prescribe speed limits for automobiles, and it is the purpose of my present invention to provide a regulator which may be readily assembled in an automobile, and connected with the ignition system thereof, in a manner which will prevent a vehicle from exceeding that speed imposed by various ordinances. A regulator embodying my invention is particularly adapted for use upon so called commercial vehicles, as distinguished from pleasure vehicles, although it may be as readily applied to the latter.

In an automobile equipped with a regulator embodying my invention, it is impossible for a driver to exceed the speed for which the regulator is set, since the operative effect of the regulator is determined by the vehicle speed and its movements are positive as determined by that speed, and the mechanisms employed will avoid any possible variation in the working condition of the regulator.

While an automobile is not in motion, the regulator will continue to function so as to permit the starting of the engine at any time or its continued running if desired, since at all times excepting in the event of a vehicle exceeding the maximum speed for which the regulator is set, the regulator will not in any way interfere with the circuit to the ignition system. The arrangement of parts, however, is such that immediately following the development of a speed in excess of that for which the regulator is set, allowing for a very brief delay to permit the driver to regain control of the automobile, the circuit to the ignition system will be interrupted, thus causing the engine to stall, resulting in an enforced reduction of speed and necessitating a subsequent restarting of the engine.

The regulator will also be effective to prevent the development of high speed by an automobile while coasting upon a grade, since if a higher speed than that for which the regulator is set, is maintained for any considerable time, the relation of the different co-operating parts for making the circuit to the ignition system, or breaking the magneto circuit when a magneto is used as a source of power for the ignition system, is such that even though a vehicle may exceed the speed limit when not under the power of the engine, the engine cannot be restarted for a period substantially equalling that during which the vehicle was operating at a higher than authorized speed.

In order to prevent a driver accidentally exceeding the limit set by the regulator, I provide the mechanism with a caution signal, preferably an audible alarm signal, which will be operated before the regulator is actuated to prevent the supply of current to the ignition system, which signal will enable the driver to reduce the speed of his vehicle to within that authorized and thus avoid the inconvenience and delay due to the necessity for restarting the engine.

The construction of the regulator is such that the vehicle may be run at any speed below that for which the regulator is set and may be reversed without interfering in any way with the adjustment or functioning of the regulator.

The essential characteristic of the invention is the provision of two movable members, one of which has a constant speed and the other of which has a variable speed, as determined by the speed of the vehicle, which members according to their relative positions will permit the electric current to pass to the ignition system, or prevent the passage of the current thereto.

The variable speed member is capable of movement under the control of the constant speed member, but is operatively connected with the running gear of the automobile in a manner to permit the actuation of this member independently of the constant speed member when the vehicle attains a speed in excess of that for which said constant speed member is set.

The invention consists primarily in a speed regulator for automobiles embodying therein a constant speed member, means whereby said member is actuated, a variable speed member, means whereby said variable speed member is normally actuated in unison with said constant speed member, but may be actuated independently thereof when its speed exceeds that of said constant speed member, means operatively connected with the running gear of an automobile, normally inoperative connections between said means and said variable speed member, whereby said member may be actuated at a speed greater than, and independently of, said constant speed member, and co-operating electrical contacts carried by said members respectively, whereby when said members are actuated in unison, the circuit to the ignition system of an internal combustion engine is closed, and is interrupted when said variable speed member is actuated independently of, and at a speed greater than, said constant speed member; and in such other novel features of construction and combination of parts as are hereinafter set forth and described, and more particularly pointed out in the claims hereto appended.

Referring to the drawings.

Like letters refer to like parts throughout the several views.

Figure 1:
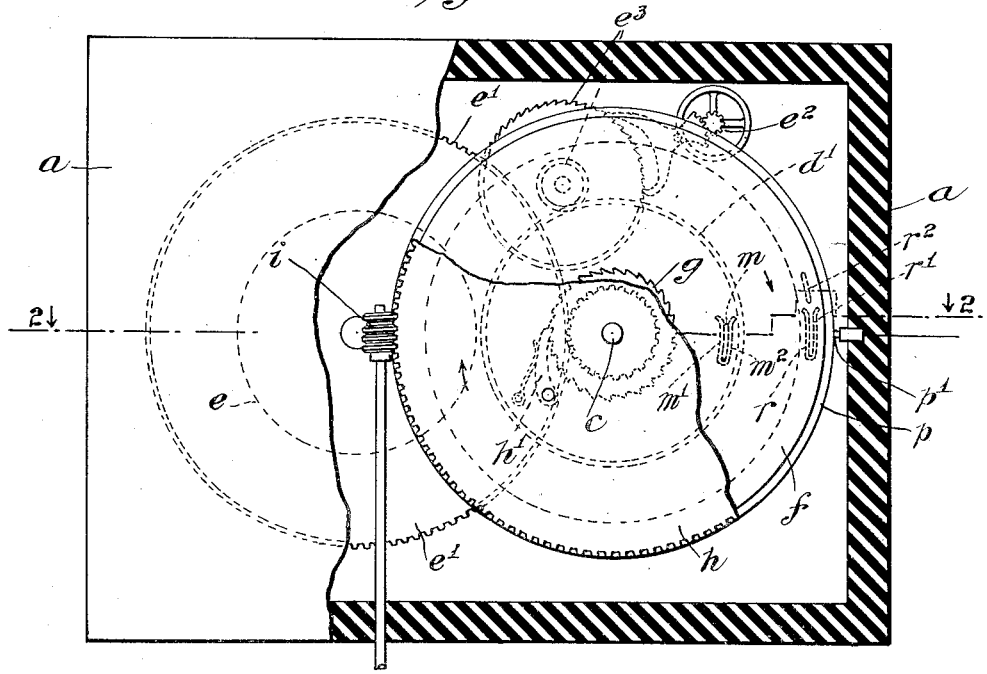
Fig. 1 is a side view of a speed regulator embodying my invention.
Figure 2:
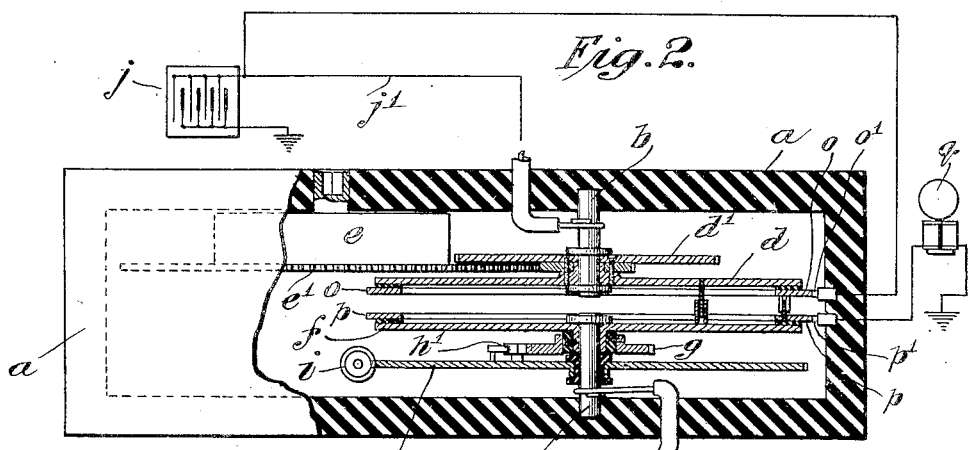
Fig. 2 is a section on the line 2—2 of Fig. 1.
Figure 3:
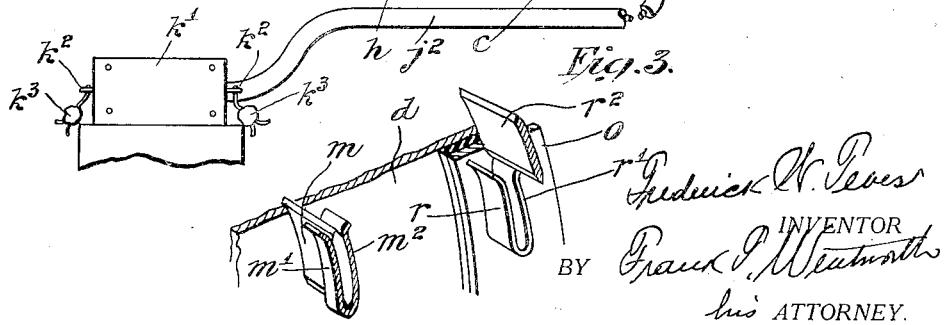
Fig. 3 is a perspective view of a fragmentary portion of the constant speed and variable speed members showing the operative connections between same, and the detailed construction of the control for the signal mechanism.
Figure 4:
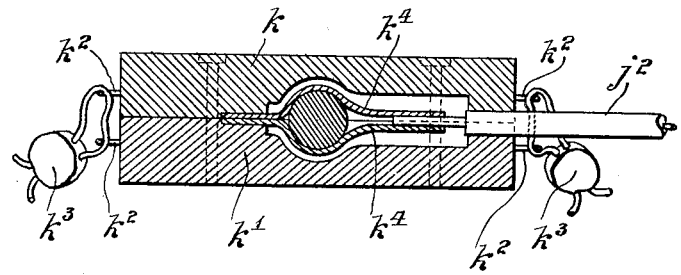
Fig. 4 is a detail view of the coupling with the timer of the ignition system to prevent tampering with the regulator.

In the embodiment of my invention shown in the drawings, $a$ indicates a closed housing for the moving parts of the regulator mechanism, which housing may be made of hard rubber or other suitable non-conducting material.

Carried by the housing $a$ in a manner not to be exposed exteriorly thereof, are oppositely disposed alined bearing studs $b$ and $c$.

Mounted upon the stud $b$ and in electrical connection therewith is a constant speed member $d$ consisting of a disc preferably made of electro-conductive material, which disc is rotated at constant speed in any desired manner, preferably by means of a spring drum $e$, power from which is transmitted to the member $d$ through the gears $e'$ and $d'$, the constant speed of said member being controlled by an escapement mechanism $e^2$ connected with said member by means of the gear train $e^3$. This particular mechanism, however, is immaterial to my invention, since any desired mechanism for imparting constant uniform speed to the member $d$ may be employed in lieu of the specific mechanism shown.

Idly mounted upon the bearing stud $c$ is a variable speed member $f$ preferably consisting of a metallic disc in electrical connection with said stud, the construction and arrangement of parts being such that said member $f$ will always be rotated at a speed at least the same as that of the member $d$, but may be operated at a higher speed by a mechanism independent of said member $d$ and operatively connected with the running gear of an automobile, under which condition, as will more fully appear hereinafter, the regulator will become effective to interrupt the circuit to the ignition system of the engine from which the power for driving the automobile is derived.

The means operatively connecting the member $f$ with the running gear of the automobile consists of a ratchet wheel $g$ carried by the member $f$ and rotatable therewith, there being idly mounted upon the stud $c$ adjacent said ratchet wheel, a worm gear $h$ carrying a pawl $h'$ co-operating with said ratchet wheel $g$. Said worm gear $h$ has associated therewith a worm $i$, the shaft of which is driven from the running gear of an automobile by means of flexible shafting, in much the same manner that ordinary speedometers are driven.

The teeth of the ratchet wheel $g$ are so set as to permit the rotation of said wheel with the member $f$ in the same direction as that of the member $d$ independently of the worm gear $h$, thus permitting said member $f$ to be rotated under the control of the member $d$ so long as the speed of the member $f$ under the control of the worm gear $h$ does not exceed that of said member $d$.

The mechanisms employed for controlling the circuit to the ignition system through the medium of the discs $d$—$f$ will vary according to whether the regulator is to be used in conjunction with an ignition system in which the current is drawn from a storage or dry cell battery, or from a magneto. The difference in the arrangement of the electrical conditions results from the fact that when the current is drawn from an electric battery, the opening of the circuit is necessary to interrupt the functioning of the ignition system, while when the current is produced by a magneto, the closing of the circuit by means of the regulator is necessary, to ground the current and cause the interruption of the functioning of the ignition system.

Figure 5:
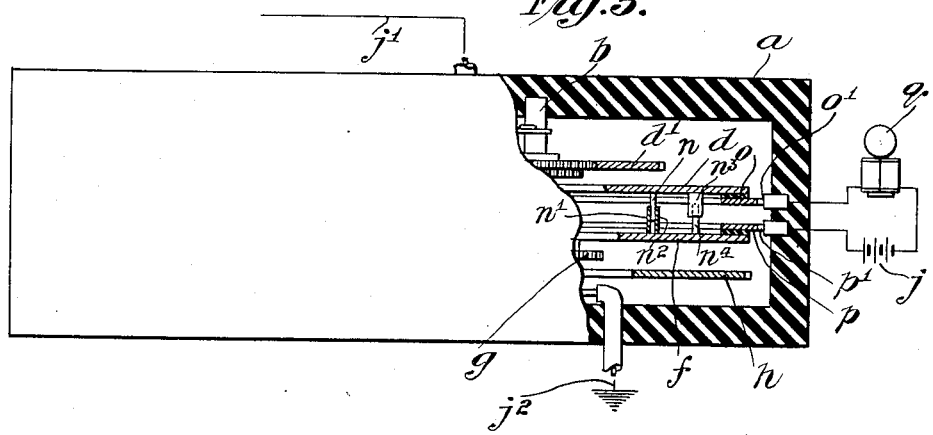
Fig. 5 is a view similar to that of Fig. 2, showing the construction employed when the regulator is used for controlling the circuit from a magneto.
Figure 6:
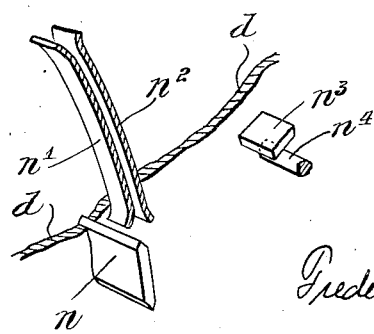
Fig. 6 is a perspective view of the mechanisms in the form of the invention shown in Fig. 3, as modified to adapt the device for use with a magneto.

In Figs. 1 to 4 of the drawings, the invention is shown in connection with an ignition system in which the current is drawn from a storage or dry battery, while in Figs. 5 and 6 I have illustrated the relation of parts when the regulator is used with a magneto system of ignition.

I will first describe the embodiment of the invention shown in Figs. 1 to 4 of the drawings. In this embodiment of the invention, I have shown at $j$ an ordinary storage battery which is electrically connected by means of the wire $j'$ with one of the bearing studs as $b$, the end of the insulated wire being firmly secured with relation to the housing $a$ in order to prevent a possible disconnection of said wire in the event that a driver should endeavor to temporarily make the regulator inoperative by cutting it out of the circuit to the ignition system.

The other stud $c$ has an insulated wire $j^2$ leading therefrom to the timer of the ignition system, with which it is connected in a manner which will prevent access to the binding post of said timer, the coupling between said wire and said timer being so constructed as to be capable of being officially sealed so as to prevent the said lead $j^2$ being disconnected from the timer without breaking the seal. Thus continuity in the functioning of a regulator is assured, since any interference with the connection at the timer can be accomplished only by breaking this seal, and the seal cannot be replaced except by one in authority.

This connection specifically consists of a bi-part fitting made of insulating material, the parts $k-k'$ of which are connected by means of screws. Each of the parts $k-k'$ have firmly embedded therein an eye or staple as $k^2$ at either or both ends thereof, so that when the parts are secured together by means of the screws, they may be wired together, and the ends of the wire united by an ordinary lead seal $k^3$. By using such a seal on both ends, a partial separation of the members $k-k'$ may be prevented. Within said members $k-k'$ are oppositely disposed contacts $k^4$ adapted to engage the screw threads of a binding post, one of said contacts $k^4$ being permanently united with the end of the wire $j^2$.

The members $k-k'$ are so formed as to leave no part of the binding post exposed, thus serving to prevent an unauthorized electrical connection with said timer.

Carried by the member $d$ is an arcuate blade $m$ of a knife edge switch, which blade is adapted to enter between and make electrical contact with the arcuate plates $m'-m^2$ carried by the member $f$.

In the form of the invention shown in Figs. 1 to 4, one end of the plates $m'-m^2$ is connected so that the blade $m$ while still in contact with the opposed plates $m'-m^2$, will engage the closed ends of said plates, and thus serve to impart movement to the member $f$ through the medium of said switch mechanism, although if desired an independent thrust connection may be used between said members $d$ and $f$ as shown in Figs. 5 and 6 of the drawings, so long as the members $m$, $m'$ and $m^2$ form the only source of electrical connection between said members.

In the form of the invention shown in Figs. 5 and 6, the construction is identical with that heretofore described, with the exception that the arrangement of the electrical connection between the members $d$ and $f$ is such that the circuit through said members will be interrupted while the member $f$ is being rotated in unison with, and under the control of, the member $d$. In this form of the invention, a blade $n$ is carried by the member $d$ and so set with relation to plates $n'-n^2$ carried by the member $f$ that when the member $f$ is being rotated under the control of the member $d$, the circuit will be open, but when the member $f$ is rotated at a speed in excess of that of the member $d$, the circuit will be closed, the stud $c$ in this form of the invention being connected with ground, the regulator being in the only ground connection for the magneto.

The plates $n'-n^2$ are sufficiently elongated to ensure a sufficient interval during which the circuit is grounded, to prevent the vehicle developing a speed in excess of that authorized and continuing this speed under the power of the engine.

In this form of the invention, power is transmitted from the member $d$ to the member $f$ through the medium of a stud $n^3$ carried by the member $d$ and adapted to engage a co-operating stud $n^4$ upon the member $f$, said studs being so constructed as to prevent the closing of the circuit from the member $d$ to the member $f$ therethrough, which construction may consist of the use of studs insulated with relation to their respective plates, or either of them, or the use of one stud of insulating material.

In both forms of the invention, I preferably provide means whereby the driver will be apprised of the vehicle attaining a speed which will result in the interruption of the ignition system, this signal preferably being an audible signal electrically actuated as a result of the increase in speed of the member $f$.

In the form of the invention shown, this signal is actuated by means of a contact ring $o$ mounted upon the member $d$, which ring is insulated from, and rotatable with, the member $d$. Upon the member $f$ I mount a similar contact ring $p$ which is insulated from, and rotatable with, said member $f$. Co-operating with the ring $o$ is a brush contact $o'$ connected with one pole of an electric battery, while co-operating with the ring $p$ is a brush $p'$ connected with the other pole of said battery, there being arranged in the circuit with said brushes, said rings and said battery, an electric bell $q$.

Carried by the ring $o$ are oppositely disposed arcuate plates $r-r'$, the ring $p$ carrying an arcuate blade $r^2$ normally spaced away from the plates $r-r'$ and being capable of electrically engaging said plates only when the speed of the member $f$ exceeds that of the member $d$. The blade $r^2$ is so set with relation to the plates $r-r'$ that it will engage said plates before the blade $m$ is disengaged from the plates $m'-m^2$ in the form of the invention shown in Figs. 1 to 4, or before the blade $n$ engages the plates $n'-n^2$ in the form of the invention shown in Figs. 5 and 6, a construction which is designed to effect the sounding of the signal before the regulator operates to interrupt the circuit to the ignition system, so as to give a driver opportunity to get his car under control before the circuit is interrupted.

To avoid grounding of the circuit through the worm $i$, it is essential in both embodiments of the invention shown, that the worm gear $h$ and the ratchet wheel $g$ be insulated from the stud $c$ and from the member $f$. By providing insulating means as described and as shown in the drawings, the electrical contacts carried by the members $d$ and $f$ constitute the sole means by which the electric circuit to the ignition system is controlled through the members $d$ and $f$.

The exact speed ratio of the worm gear $h$ and of a front wheel of the vehicle from which the worm $i$ is driven, is immaterial to the invention, it being essential, however, that the actuating means for the member $d$ be so constructed that its constant speed shall be equal to that of the worm gear $h$ when the vehicle is running at the maximum speed for which the regulator is set.

The operation of the herein described speed regulator is substantially as follows:—

Assuming that the maximum speed allowed by law is twenty miles per hour and that at this speed the worm gear $h$ will have six R. P. H., (it being understood, however, that these figures are merely arbitrary) the means for actuating the member $d$ must be such as to impart to said member a continued movement at the rate of six R. P. H.

Under normal working conditions, so long as the speed of the vehicle does not exceed twenty miles per hour, or the vehicle is at rest, the blade $m$ will be in constant engagement with the plates $m'$ and $m^2$ so that the circuit from the battery $j$ through the wire $j'$, stud $b$, member $d$, said contacts, member $f$, stud $c$ and wire $j^2$ to the ignition system will be closed at all times, thus permitting the running of the engine. Under these conditions the blade $r^2$ will be out of engagement with the plates $r-r'$, the rings $o$ and $p$, however, being constantly engaged by the brushes $o'$ and $p'$.

Hence, while the vehicle is running at a speed not exceeding twenty miles per hour, the circuit to the ignition system will be constantly closed by reason of a fixed relative position of the members $d$ and $f$, while the circuit to the signal $q$ will be interrupted.

While a vehicle is in motion, the member $f$ will be turned at the same speed as, and through the medium of, the member $d$, which speed will be the maximum speed at which the member $f$ may be turned with the vehicle running at the maximum speed for which the regulator is set. This movement of the member $f$ is entirely under the control of the member $d$ and the speed referred to will be maintained irrespective of the speed of the worm gear $h$, since the pawl and ratchet mechanism $h'-g$ will be inoperative so long as the worm gear $h$ is turning at a speed of less than six R. P. H.

In the form of the invention shown in Figs. 5 and 6, the conditions will be as above stated excepting that the cooperating thrust members $n^3$ and $n^4$ will be constantly engaged and the plates $n'$ and $n^2$ will be normally disengaged from the blade $n$ so long as the speed of the vehicle is less than twenty miles per hour.

If, however, the speed of the vehicle shall exceed twenty miles per hour, the member $f$ will be rotated at a greater speed than the member $d$, thus moving the blade $m$ in relation to the plates $m'$ and $m^2$ by reason of the resultant difference in speeds between the members $d$ and $f$. By elongating said plates and said blade, the circuit will not be immediately interrupted, thus permitting a momentary increase of speed without stalling the engine. If, however, this speed in excess of twenty miles per hour be maintained for a very short distance, the blade $m$ will pass from engagement with the plates $m'$ and $m^2$, thus interrupting the circuit to the ignition system and preventing the application of power to the vehicle until the speed of the member $f$ has been reduced for a sufficient interval to permit the plates $m'$ and $m^2$ to reengage the blade $m$.

Hence it will be apparent that nothing can be gained by running a vehicle in excess of the authorized speed, or the speed for which the regulator is set, since any temporary saving of time will be more than offset by the delays incidental to the re-engagement of the blade $m$ with the plates $m'$ and $m^2$ and the re-starting of the engine, particularly as in commercial vehicles the use of automatic starters is not extensive, and the re-starting of the engine would require the driver to descend from the vehicle and use the manual starting crank.

If a driver permits the vehicle to coast on a grade, it is apparent that the interruption of the circuit to the ignition system will not have the effect of stalling the engine, so that if the grade be long enough the vehicle may run at a speed in excess of twenty miles per hour for a considerable time. The result, however, will be a wide separation of the blade $m$ from the plates $m'$ and $m^2$, so that when the driver is desirous of again applying power to the engine, it will be necessary for him to wait until there has been a sufficient lapse of time corresponding with that during which the vehicle was running in excess of the speed for which the regulator was set, before the circuit to the ignition system can be closed by the re-engagement of the blade $m$ with the plates $m'$ and $m^2$, during which time the vehicle will remain at rest or be running at a low speed under momentum.

There is always a certain element of danger in the sudden stalling of an engine, particularly where traffic is heavy, so that a knowledge of the above conditions will be a strong incentive for a driver to keep his vehicle within the speed limit.

To avoid an unintentional exceeding of the authorized speed, I provide the signal mechanism, which will be sounded or otherwise actuated prior to the disengagement of the blade $m$ from the plates $m'$ and $m^2$, or the engagement of the blade $n$ with the plates $n'$ and $n^2$, thus permitting the driver to use his brake to reduce the speed of the vehicle before the circuit to the ignition system is interrupted.

The functioning of the embodiment of the invention shown in Figs. 5 and 6 is identical with that heretofore described, with the exception that a variation of the speed of the member $f$ to cause it to turn at a higher speed than the member $d$, will engage the blade $n$ with the plates $n'$ and $n^2$, thus grounding the circuit from the magneto, and in this way interrupting the functioning of the ignition system. The elongation of the plates $n'$ and $n^2$ or of the blade $n$ will interrupt the ignition system for a sufficient interval to prevent a temporary excess of speed by first engaging the blade $n$ with the plates $n'$ and $n^2$ and then disengaging the blade from said plates to permit a further running at excessively higher speed.

By using a sealed coupling between the wire $j^2$ and the timer, and by avoiding exposure of any portion of the wire $j'$ or of the electrical connections between same and the timer of the ignition system, and by using a housing $a$ of insulating material by which all of the metallic parts of the regulator are concealed, a temporary bridging of the regulator, or the shunting of the current about same to the ignition system, is prevented. By the employment of seals $k^3$ any temporary removal of the parts $k$—$k'$ without detection, is prevented.

It will be observed that the operation of all the working parts of the herein described regulator, is positive and definite, and that the arrangement is such that there is little or no likelihood of any material variation in the functioning of the regulator. By using a key-wound clockworks carried within the housing $a$, constant attention is required to keep the regulator in operation, since a stoppage of the member $d$ will prevent any material movement of the vehicle, since if the member $d$ be stationary, the member $f$ will have movement relative thereto immediately when the vehicle is started.

The mechanism by which the member $d$ is actuated is capable of wide variation, and the use of an actuating mechanism within the housing $a$ is resorted to merely for the the purpose of preventing a change of parts which will result in this member being operated at a higher speed than that for which the regulator is set.

It is not my intention to limit the invention to the precise details of construction shown in the accompanying drawings, it being apparent that such may be varied without departing from the spirit and scope of the invention.

Having described the invention, what I claim as new and desire to have protected by Letters Patent, is:—

1. A speed regulator for automobiles embodying therein a constant speed member, means whereby said member is actuated, a variable speed member, means whereby said variable speed member is normally actuated in unison with said constant speed member, but may be actuated independently thereof when its speed exceeds that of said constant speed member, means operatively connected with the running gear of an automobile, normally inoperative connections between said means and said variable speed member, whereby said member may be actuated at a speed greater than, and independently of, said constant speed member, and co-operating electrical contacts carried by said members respectively, whereby when said members are actuated in unison, the circuit to the ignition system of an internal combustion engine is closed, and is interrupted when said variable speed member is actuated independently of, and at a speed greater than, said constant speed member.

2. A speed regulator for automobiles embodying therein a rotatable constant speed member, means whereby said member is actuated, a rotatable variable speed member, means whereby said variable speed member is normally actuated in unison with said constant speed member, but may be actuated independently thereof when its speed exceeds that of said constant speed member, means operatively connected with the running gear of an automobile, normally inoperative connections between said means and said variable speed member, whereby said member may be actuated at a speed greater than, and independently of, said constant speed member, and co-operating electrical contacts carried by said members respectively, whereby when said members are actuated in unison, the circuit to the ignition system of an internal combustion engine is closed, and is interrupted when said variable speed member is actuated independently of, and at a speed greater than, said constant speed member.

3. A speed regulator for automobiles embodying therein a rotatable constant speed member, means whereby said member is actuated, a rotatable variable speed member, means whereby said variable speed member is normally actuated in unison with said constant speed member, but may be actuated independently thereof when its speed exceeds that of said constant speed member, a worm gear idly mounted adjacent said variable speed member, a pawl and ratchet wheel mechanism, one of the members of which is carried by, and rotatable with, said variable speed member, and the other member of which is carried by said worm gear, a worm co-operating with said worm gear, means rotating said worm at a speed coincident with that of a wheel of a vehicle, whereby when the vehicle is running at a low speed, said variable speed member will be actuated by said constant speed member, but when the speed of the vehicle is sufficiently great, the speed of said variable speed member will be greater than that of said constant speed member, and co-operating electrical contacts carried by said members respectively, whereby when said members are actuated in unison, the circuit to the ignition system of an internal combustion engine is closed, and is interrupted when said variable speed member is actuated independently of, and at a speed greater than, said constant speed member.

4. A speed regulator for automobiles embodying therein a constant speed member, means whereby said member is actuated, a variable speed member, means whereby said variable speed member is normally actuated in unison with said constant speed member, but may be actuated independently thereof when its speed exceeds that of said constant speed member, means operatively connected with the running gear of an automobile, normally inoperative connections between said means and said variable speed member, whereby said member may be actuated at a speed greater than, and independently of, said constant speed member, an electrical contact carried by said variable speed member, and a co-operating electrical contact carried by said constant speed member and adapted to electrically and mechanically engage said other contact, whereby when said members are actuated in unison, the circuit to the ignition system of an internal combustion engine is closed, and is interrupted when said variable speed member is actuated independently of, and at a speed greater than, said constant speed members.

5. A speed regulator for automobiles embodying therein a rotatable constant speed member, means whereby said member is actuated, a rotatable variable speed member, means whereby said variable speed member is normally actuated in unison with said constant speed member, but may be actuated independently thereof when its speed exceeds that of said constant speed member, means operatively connected with the running gear of an automobile, normally inoperative connections between said means and said variable speed member, whereby said member may be actuated at a speed greater than, and independently of, said constant speed member, an electrical contact carried by said variable speed member, and a co-operating electrical contact carried by said constant speed member and adapted to electrically and mechanically engage said other contact, whereby when said members are actuated in unison, the circuit to the ignition system of an internal combustion engine is closed, and is interrupted when said variable speed member is actuated independently of, and at a speed greater than, said constant speed member.

6. A speed regulator for automobiles embodying therein a rotatable constant speed member, means whereby said member is actuated, a rotatable variable speed member, means whereby said variable speed member is normally actuated in unison with said constant speed member, but may be actuated independently thereof when its speed exceeds that of said constant speed member, a worm gear idly mounted adjacent said variable speed member, a pawl and ratchet wheel mechanism, one of the members of which is carried by, and rotatable with, said variable speed member, and the other member of which is carried by said worm gear, a worm co-operating with said worm gear, means rotating said worm at a speed coincident with that of a wheel of a vehicle, whereby when the vehicle is running at a low speed, said variable speed member will be actuated by said constant speed member, but when the speed of the vehicle is sufficiently great, the speed of said variable speed member will be greater than that of said constant speed member, an electrical contact carried by said variable speed member, and a co-operating electrical contact carried by said constant speed member and adapted to electrically and mechanically engage said other contact, whereby when said members are actuated in unison, the circuit to the ignition system of an internal combustion engine is closed, and is interrupted when said variable speed member is actuated independently of, and at a speed greater than, said constant speed member.

7. A speed regulator for automobiles embodying therein a rotatable constant speed member, means whereby said member is actuated, a rotatable variable speed member, means whereby said variable speed member is normally actuated in unison with said constant speed member, but may be actuated independently thereof when its speed exceeds that of said constant speed member, means operatively connected with the running gear of an automobile, normally inoperative connections between said means and said variable speed member, whereby said member may be actuated at a speed greater than, and independently of, said constant speed member, an arcuate electrical contact blade carried by said variable speed member, and arcuate plates carried by said constant speed member, said plates being spaced apart to receive said blade and connected to mechanically engage said blade, whereby when said members are actuated in unison, the circuit to the ignition system of an internal combustion engine is closed, and is interrupted when said variable speed member is actuated independently of, and at a speed greater than, said constant speed member, and slight relative movement of said contact members is permitted before the said blade moves out of electrical contact with said plates.

8. A speed regulator for automobiles embodying therein a constant speed member, means whereby said member is actuated, a variable speed member, means whereby said variable speed member is normally actuated in unison with said constant speed member, but may be actuated independently thereof when its speed exceeds that of said constant speed member, means operatively connected with the running gear of an automobile, normally inoperative connections between said means and said variable speed member, whereby said member may be actuated at a speed greater than, and independently of, said constant speed member, co-operating electrical contacts carried by said members respectively, whereby when said members are actuated in unison, the circuit to the ignition system of an internal combustion engine is closed, and is interrupted when said variable speed member is actuated independently of, and at a speed greater than, said constant speed member, normally disengaged electrical contacts carried by and insulated from said members respectively, an electrically actuated alarm, and means whereby said contacts and said alarm may be included in an electrical circuit, said contacts, when said members are moving in unison, being spaced apart, and being engaged before said first named electrical contacts become operative to interrupt the circuit to the ignition system.

9. A speed regulator for automobiles embodying therein a rotatable constant speed member, means whereby said member is actuated, a rotatable variable speed member, means whereby said variable speed member is normally actuated in unison with said constant speed member, but may be actuated independently thereof when its speed exceeds that of said constant speed member, means operatively connected with the running gear of an automobile, normally inoperative connections between said means and said variable speed member, whereby said member may be actuated at a speed greater than, and independently of, said constant speed member, co-operating electrical contacts carried by said members respectively, whereby when said members are actuated in unison, the circuit to the ignition system of an internal combustion engine is closed, and is interrupted when said variable speed member is actuated independently of, and at a speed greater than, said constant speed member, conductor rings carried by said members respectively, normally disengaged electrical contacts carried by said rings, an electrically actuated alarm, and means whereby said rings and said alarm may be included in an electrical circuit, said contacts, when said members are moving in unison, being spaced apart, and being engaged before said first named electrical contacts become operative to interrupt the circuit to the ignition system.

10. A speed regulator for automobiles embodying therein a rotatable constant speed member, means whereby said member is actuated, a rotatable variable speed member, means whereby said variable speed member is normally actuated in unison with said constant speed member, but may be actuated independently thereof when its speed exceeds that of said constant speed member, a worm gear idly mounted adjacent said variable speed member, a pawl and ratchet wheel mechanism, one of the members of which is carried by, and rotatable with, said variable speed member, and the other member of which is carried by said worm gear, a worm co-operating with said worm gear, means rotating said worm at a speed co-incident with that of a wheel of a vehicle, whereby when the vehicle is running at a low speed, said variable speed member will be actuated by said constant speed member, but when the speed of the vehicle is sufficiently great, the speed of said variable speed member will be greater than that of said constant speed member, co-operating electrical contacts carried by said members respectively, whereby when said members are actuated in unison, the circuit to the ignition system of an internal combustion engine is closed, and is interrupted when said variable speed member is actuated independently of, and at a speed greater than, said constant speed member, conductor rings carried by said members respectively, normally disengaged electrical contacts carried by said rings, an electrically actuated alarm, and means whereby said rings and said alarm may be included in an electrical circuit, said contacts, when said members are moving in unison, being spaced apart, and being engaged before said first named electrical contacts become operative to interrupt the circuit to the ignition system.

11. A speed regulator for automobiles embodying therein two axially alined studs insulated one from the other, a rotatable constant speed member mounted upon one of said studs, means whereby said member is actuated, a rotatable variable speed member mounted upon the other of said studs, means whereby said variable speed member is normally actuated in unison with said constant speed member, but may be actuated independently thereof when its speed exceeds that of said constant speed member, electrical conductors connected with said studs respectively, means operatively connected with the running gear of an automobile, normally inoperative connections between said means and said variable speed member, whereby said member may be actuated at a speed greater than, and independently of, said constant speed member, and co-operating electrical contacts carried by said members respectively, whereby when said members are actuated in unison, the circuit to the ignition system of an internal combustion engine is closed, and is interrupted when said variable speed member is actuated independently of, and at a speed greater than, said constant speed member.

12. A speed regulator for automobiles embodying therein two axially alined studs insulated one from the other, a rotatable constant speed member mounted upon one of said studs, means whereby said member is actuated, a rotatable variable speed member mounted upon the other of said studs, means whereby said variable speed member is normally actuated in unison with said constant speed member, but may be actuated independently thereof when its speed exceeds that of said constant speed member, electrical conductors connected with said studs respectively, a worm gear idly mounted adjacent said variable speed member, a pawl and ratchet wheel mechanism, one of the members of which is carried by, and rotatable with, said variable speed member, and the other member of which is carried by said worm gear, a worm co-operating with said worm gear, means rotating said worm at a speed coincident with that of a wheel of a vehicle, whereby when the vehicle is running at a low speed, said variable speed member will be actuated by said constant speed member, but when the speed of the vehicle is sufficiently great, the speed of said variable speed member will be greater than that of said constant speed member, said worm gear and said ratchet wheel being mounted upon, and insulated from, the stud carrying said variable speed member, and co-operating electrical contacts carried by said members respectively, whereby when said members are actuated in unison, the circuit to the ignition system of an internal combustion engine is closed, and is interrupted when said variable speed member is actuated independently of, and at a speed greater than, said constant speed member.

13. A speed regulator for automobiles embodying therein two axially alined studs insulated one from the other, a rotatable constant speed member mounted upon one of said studs, means whereby said member is actuated, a rotatable variable speed member mounted upon the other of said studs, means whereby said variable speed member is normally actuated in unison with said constant speed member, but may be actuated independently thereof when its speed exceeds that of said constant speed member, electrical conductors connected with said studs respectively, means operatively connected with the running gear of an automobile, normally inoperative connections between said means and said variable speed member, whereby said member may be actuated at a speed greater than, and independently of, said constant speed member, co-operating electrical contacts carried by said members respectively, whereby when said members are actuated in unison, the circuit to the ignition system of an internal combustion engine is closed, and is interrupted when said variable speed member is actuated independently of, and at a speed greater than, said constant speed member, normally disengaged electrical contacts carried by and insulated from said members respectively, an electrically actuated alarm, and means whereby said contacts and said alarm may be included in an electrical circuit, said contacts, when said members are moving in unison, being spaced apart, and being engaged before said first named electrical contacts become operative to interrupt the circuit to the ignition system.

14. A speed regulator for automobiles embodying therein a constant speed member, means whereby said member is actuated, a variable speed member, means whereby said variable speed member is normally actuated in unison with said constant speed member, but may be actuated independently thereof when its speed exceeds that of said constant speed member, means operatively connected with the running gear of an automobile, normally inoperative connections between said means and said variable speed member, whereby said member may be actuated at a speed greater than, and independently of, said constant speed member, co-operating electrical contacts carried by said members respectively, whereby when said members are actuated in unison, the circuit to the ignition system of an internal combustion engine is closed, and is interrupted when said variable speed member is actuated independently of, and at a speed greater than, said constant speed member, and a housing of insulating material enclosing and preventing access to said constant and said variable speed members and the means actuating same.

15. A speed regulator for automobiles embodying therein a constant speed member, means whereby said member is actuated, a variable speed member, means whereby said variable speed member is normally actuated in unison with said constant speed member, but may be actuated independently thereof when its speed exceeds that of said constant speed member, means operatively connected with the running gear of an automobile, normally inoperative connections between said means and said variable speed member, whereby said member may be actuated at a speed greater than, and independently of, said constant speed member, co-operating electrical contacts carried by said members respectively, whereby when said members are actuated in unison, the circuit to the ignition system of an internal combustion engine is closed, and is interrupted when said variable speed member is actuated independently of, and at a speed greater than, said constant speed member, an electrical conductor between said constant speed member and a source of electrical supply, an electrical conductor leading from said variable speed member, a bi-part insulating coupling member carried by and permanently connected with said last named conductor, and means whereby the parts of said coupling member may be permanently connected and sealed.

In witness whereof I have hereunto affixed my signature, in the presence of two subscribing witnesses, this 23rd day of January, 1922.

FREDERICK W. TEVES.

Witnesses:
F. T. WENTWORTH,
FRIEDA KOEHLER.